US011506086B2

(12) United States Patent
Arai

(10) Patent No.: US 11,506,086 B2
(45) Date of Patent: Nov. 22, 2022

(54) TURBINE HOUSING AND TURBO CHARGER PROVIDED WITH SAME

(71) Applicant: MITSUBISHI HEAVY INDUSTRIES ENGINE & TURBOCHARGER, LTD., Sagamihara (JP)

(72) Inventor: Takashi Arai, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 242 days.

(21) Appl. No.: 16/469,829

(22) PCT Filed: Mar. 31, 2017

(86) PCT No.: PCT/JP2017/013586
§ 371 (c)(1),
(2) Date: Jun. 14, 2019

(87) PCT Pub. No.: WO2018/179328
PCT Pub. Date: Oct. 4, 2018

(65) Prior Publication Data
US 2019/0316516 A1 Oct. 17, 2019

(51) Int. Cl.
*F01D 25/26* (2006.01)
(52) U.S. Cl.
CPC .......... *F01D 25/26* (2013.01); *F05D 2220/40* (2013.01); *F05D 2240/15* (2013.01)
(58) Field of Classification Search
CPC ........ F01D 25/24; F01D 25/26; F01D 25/145; F01D 9/026; F05D 2220/40; F05D 2240/15
See application file for complete search history.

(56) References Cited

U.S. PATENT DOCUMENTS 3,310,940 A * 3/1967 Oetliker ................ F01D 25/145
60/804
7,074,009 B2 * 7/2006 Allmang .................. F01D 9/026
415/177

(Continued)

FOREIGN PATENT DOCUMENTS

DE 10 2009 010 311 A1 8/2010
EP 3 088 699 A1 11/2016

(Continued)

OTHER PUBLICATIONS

Extended European Search Report for European Application No. 17903112.5, dated Nov. 13, 2019.

(Continued)

*Primary Examiner* — Brian P Wolcott
(74) *Attorney, Agent, or Firm* — Birch, Stewart, Kolasch & Birch, LLP

(57) ABSTRACT

Provided is a turbine housing (10) having: a housing part (11) that forms a spiral space (S5) extending around a rotating shaft (40); a heat-shielding core (12) which is disposed in the spiral space (S5) and forms a spiral exhaust gas flow passage (S6) in which exhaust gas introduced from an exhaust gas introduction port flows; and a variable nozzle mechanism (13) that guides the exhaust gas to a turbine wheel, wherein heat-shielding spaces (S1, S2, S3) are formed between the inner circumferential surface of the housing part (11) and the outer circumferential surface of the heat-shielding core (12), and wherein the heat-shielding core (12) has a first flange part (12*d*) and a second flange part (12*e*) and is fixed between the variable nozzle mechanism (13) and the housing part (11) while a first sealing (14) is interposed between the first flange part (12*d*) and the variable nozzle mechanism (13).

13 Claims, 11 Drawing Sheets

(56) References Cited

U.S. PATENT DOCUMENTS

| | | | |
|---|---|---|---|
| 7,234,302 B2* | 6/2007 | Korner | F01D 9/026 |
| | | | 285/41 |
| 8,382,429 B2* | 2/2013 | Grussmann | F01D 11/005 |
| | | | 415/213.1 |
| 8,628,296 B2* | 1/2014 | Grussmann | F02C 7/12 |
| | | | 415/204 |
| 8,726,655 B2* | 5/2014 | Smatloch | F01D 25/243 |
| | | | 60/602 |
| 9,841,033 B2* | 12/2017 | Henke | F04D 29/4206 |
| 9,850,777 B2* | 12/2017 | Uesugi | F01D 17/165 |
| 10,094,243 B2* | 10/2018 | Grussmann | F01D 25/243 |
| 10,145,267 B2* | 12/2018 | Yokoyama | F02B 39/16 |
| 10,240,485 B2* | 3/2019 | Grussmann | F02B 37/02 |
| 10,677,096 B2* | 6/2020 | Ho | F01D 9/026 |
| 10,801,368 B2* | 10/2020 | Sakamoto | F02B 39/14 |
| 2002/0085932 A1* | 7/2002 | Loffler | F01D 25/26 |
| | | | 417/407 |
| 2004/0109759 A1 | 6/2004 | Korner | |
| 2006/0133931 A1* | 6/2006 | Burmester | F01D 9/026 |
| | | | 415/204 |
| 2006/0188368 A1 | 8/2006 | Jinnai | |
| 2014/0212277 A1 | 7/2014 | Uesugi | |
| 2016/0115823 A1 | 4/2016 | Henke et al. | |
| 2016/0290163 A1 | 10/2016 | Yokoyama | |
| 2018/0016942 A1 | 1/2018 | Sakamoto et al. | |
| 2020/0056628 A1* | 2/2020 | Sakuma | F01D 25/08 |
| 2020/0182257 A1* | 6/2020 | Uemura | F04D 29/403 |
| 2020/0200073 A1* | 6/2020 | Uemura | F01D 17/165 |
| 2020/0309144 A1* | 10/2020 | Uemura | F02B 37/025 |

FOREIGN PATENT DOCUMENTS

| | | |
|---|---|---|
| JP | 1-159103 U | 11/1989 |
| JP | 2003-293779 A | 10/2003 |
| JP | 2004-183651 A | 7/2004 |
| JP | 2006-220053 A | 8/2006 |
| JP | 2013-47525 A | 3/2013 |
| JP | 2014-145300 A | 8/2014 |
| JP | 5880463 B2 | 3/2016 |
| JP | 2016-518553 A | 6/2016 |
| WO | WO 2016/139799 A1 | 9/2016 |

OTHER PUBLICATIONS

International Search Report for International Application No. PCT/JP2017/013586, dated May 30, 2017, with English translation.
Written Opinion of the International Searching Authority for International Application No. PCT/JP2017/013586, dated May 30, 2017, with English translation.

* cited by examiner

TURBINE HOUSING AND TURBO CHARGER PROVIDED WITH SAME

TECHNICAL FIELD

The present invention relates to a turbine housing and a turbo charger provided with the same.

BACKGROUND ART

Known in the related art is a turbo charger supplying pressurized air to an intake manifold by rotating a turbine wheel by using the energy of exhaust gas guided from an engine and rotating a compressor wheel provided coaxially with the turbine wheel (see, for example, PTL 1 and PTL 2).

In order to improve the efficiency of the turbo charger, it is necessary to guide the thermal energy of the exhaust gas introduced into the turbine housing to a turbine with the loss of the thermal energy minimized. However, the thermal energy of the exhaust gas introduced into the turbine housing dissipates in part to the outside of the turbine housing during passage through a scroll flow passage part (scroll part) in the turbine housing.

In PTL 1, a heat insulation layer that has a heat insulation core covered with a sheet metal shell is disposed as a separate part in a turbine volute so that the thermal energy of exhaust gas does not dissipate to the outside. In PTL 2, a heat-shielding plate is disposed in a turbine housing so that the turbine housing is blocked from heat and the thermal energy of exhaust gas is not lost.

CITATION LIST

Patent Literature

[PTL 1] PCT Japanese Translation Patent Publication No. 2016-518553
[PTL 2] Japanese Patent No. 5880463

SUMMARY OF INVENTION

Technical Problem

The heat insulation layer of PTL 1 covers the heat insulation core with the sheet metal shell conforming to the shape of the heat insulation core, and thus the heat insulation layer entails a high manufacturing cost and the mass productivity of the heat insulation layer is low. The heat-shielding plate of PTL 2 is fixed by inner and outer circumferential side edge portions being sandwiched by different members, and thus no thermal stress can be reduced and breakage may arise from fatigue accumulation.

The present invention has been made in view of such circumstances, and an object of the present invention is to provide a high-mass productivity turbine housing capable of reducing the amount of thermal energy loss of the exhaust gas introduced into the turbine housing and the thermal stress generated at a flow passage part and a turbo charger provided with the same.

Solution to Problem

The present invention adopts the following means in order to achieve the above object.

A turbine housing according to an aspect of the present invention is a turbine housing connected to a bearing housing rotatably supporting a rotating shaft of a turbine wheel. The turbine housing includes a housing part having a first inner circumferential side wall portion, a first outer circumferential side wall portion, and a first bottom surface part and forming a spiral space extending around the rotating shaft, a flow passage part having a second inner circumferential side wall portion, a second outer circumferential side wall portion, and a second bottom surface part, disposed in the spiral space, and forming a spiral exhaust gas flow passage in which exhaust gas introduced from an exhaust gas introduction port flows, and a nozzle part guiding the exhaust gas introduced into the exhaust gas flow passage to the turbine wheel connected to the rotating shaft. A heat-shielding space is formed between an inner circumferential surface of the housing part and an outer circumferential surface of the flow passage part. The flow passage part has an inner circumferential side flange part protruding from the second inner circumferential side wall portion to an inner circumferential side in a radial direction of the rotating shaft and an outer circumferential side flange part protruding from the second outer circumferential side wall portion to an outer circumferential side in the radial direction. The inner circumferential side flange part is fixed between the nozzle part and the housing part in a state where an annular seal part elastically deformable in the rotating shaft direction is interposed between the inner circumferential side flange part and the nozzle part and the outer circumferential side flange part is fixed between the nozzle part and the housing part.

In the turbine housing according to an aspect of the present invention, the heat-shielding space is disposed between the outer circumferential surface of the flow passage part disposed in the spiral space and the inner circumferential surface of the housing part forming a spiral space. Accordingly, the amount of loss of thermal energy dissipating to the outside via the housing part from the flow passage part where the exhaust gas flow passage is formed is reduced. In addition, the flow passage part of the turbine housing according to an aspect of the present invention has the inner circumferential side flange part and the outer circumferential side flange part, the turbine housing has a simple structure in which the inner circumferential side flange part and the outer circumferential side flange part are fixed between other members, and thus the mass productivity of the turbine housing is high. In addition, in the turbine housing according to an aspect of the present invention, the inner circumferential side flange part is fixed between the nozzle part and the housing part in a state where the annular seal part elastically deformable in the rotating shaft direction is interposed between the nozzle part and the inner circumferential side flange part. Accordingly, the annular seal part is elastically deformed in the rotating shaft direction and the thermal stress generated in the flow passage part can be reduced even in a case where the flow passage part expands in the rotating shaft direction due to the heat of exhaust gas.

In the turbine housing according to an aspect of the present invention, the heat-shielding space may be formed between the first inner circumferential side wall portion and the second inner circumferential side wall portion, between the first outer circumferential side wall portion and the second outer circumferential side wall portion, and between the first bottom surface part and the second bottom surface part, respectively.

As a result, the amount of loss of thermal energy dissipating from the flow passage part to the outside via the housing part is reduced by the shielding spaces respectively provided on the inner side of the first inner circumferential side wall portion of the flow passage part, the first outer circumferential side wall portion of the flow passage part, and the lower side of the first bottom surface part of the flow passage part.

In the turbine housing according to an aspect of the present invention, the exhaust gas introduction port may be formed at the housing part, the flow passage part may have an opening portion being open toward the exhaust gas introduction port, and the second inner circumferential side wall portion may form an inner circumferential side seal region by contact with the first inner circumferential side wall portion, the second outer circumferential side wall portion may form an outer circumferential side seal region by contact with the first outer circumferential side wall portion, and the second bottom surface part may form a bottom surface side seal region by contact with the first bottom surface part at the exhaust gas introduction port.

As a result, each of the inner circumferential side seal region, the outer circumferential side seal region, and the bottom surface side seal region is formed at the exhaust gas introduction port formed at the housing part. Accordingly, no gap is formed between the exhaust gas introduction port of the housing part and the opening portion of the flow passage part and the problem that the exhaust gas guided from the exhaust gas introduction port to the exhaust gas flow passage of the flow passage part is guided in part from the exhaust gas introduction port to the shielding space is prevented.

The turbine housing according to an aspect of the present invention may be configured to further include a heat-shielding member with which the heat-shielding space is filled.

As a result, the heat insulation properties of the heat-shielding space are further improved and the amount of loss of thermal energy dissipating from the flow passage part to the outside via the housing part is further reduced.

A turbo charger according to an aspect of the present invention includes a bearing housing rotatably supporting a rotating shaft of a turbine wheel and the turbine housing according to any of the above connected to the bearing housing.

As a result, it is possible to provide a high-mass productivity turbo charger capable of reducing the amount of thermal energy loss of the exhaust gas introduced into a turbine housing and the thermal stress generated at a flow passage part.

Advantageous Effects of Invention

According to the present invention, it is possible to provide a high-mass productivity turbine housing capable of reducing the amount of thermal energy loss of the exhaust gas introduced into the turbine housing and the thermal stress generated at a flow passage part and a turbo charger provided with the same.

DESCRIPTION OF EMBODIMENTS

First Embodiment

Hereinafter, a turbo charger 100 according to a first embodiment of the present invention will be described with reference to accompanying drawings.

The turbo charger 100 of the present embodiment is, for example, a variable geometry (VG) turbo charger provided with a variable nozzle mechanism (nozzle part) 13. The VG turbo charger has the variable nozzle mechanism 13 in a turbine housing 10. The variable nozzle mechanism 13 appropriately adjusts the rotation speed of a turbine wheel by adjusting the flow rate of exhaust gas introduced by nozzle opening degree adjustment. The turbo charger 100 generates compressed air and supplies the compressed air to an internal combustion engine by rotating an impeller of a compressor connected to the turbine wheel via a rotating shaft 40.

Figure 1:
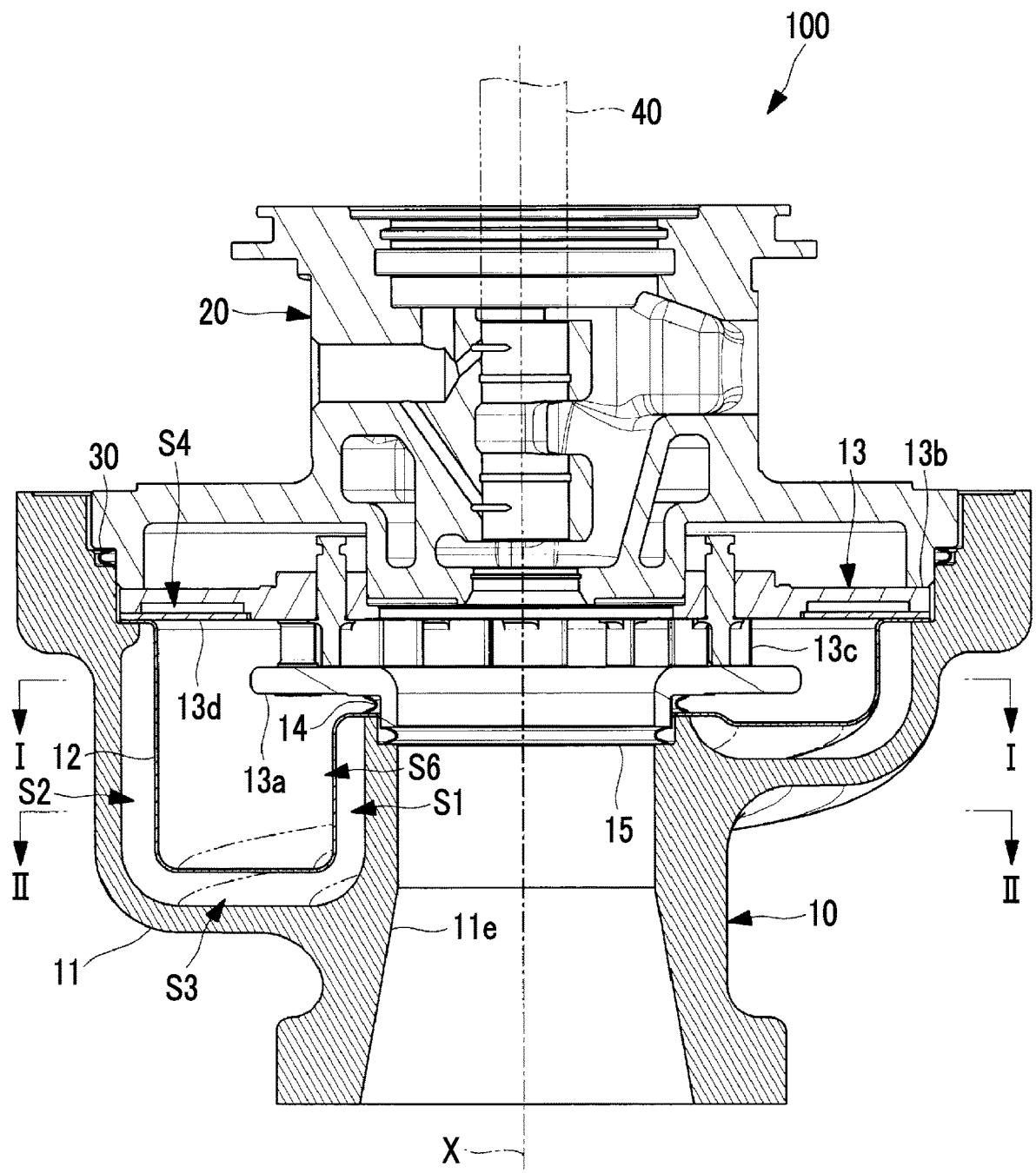
FIG. 1 is a longitudinal cross-sectional view illustrating a turbo charger according to a first embodiment of the present invention.
Figure 2:
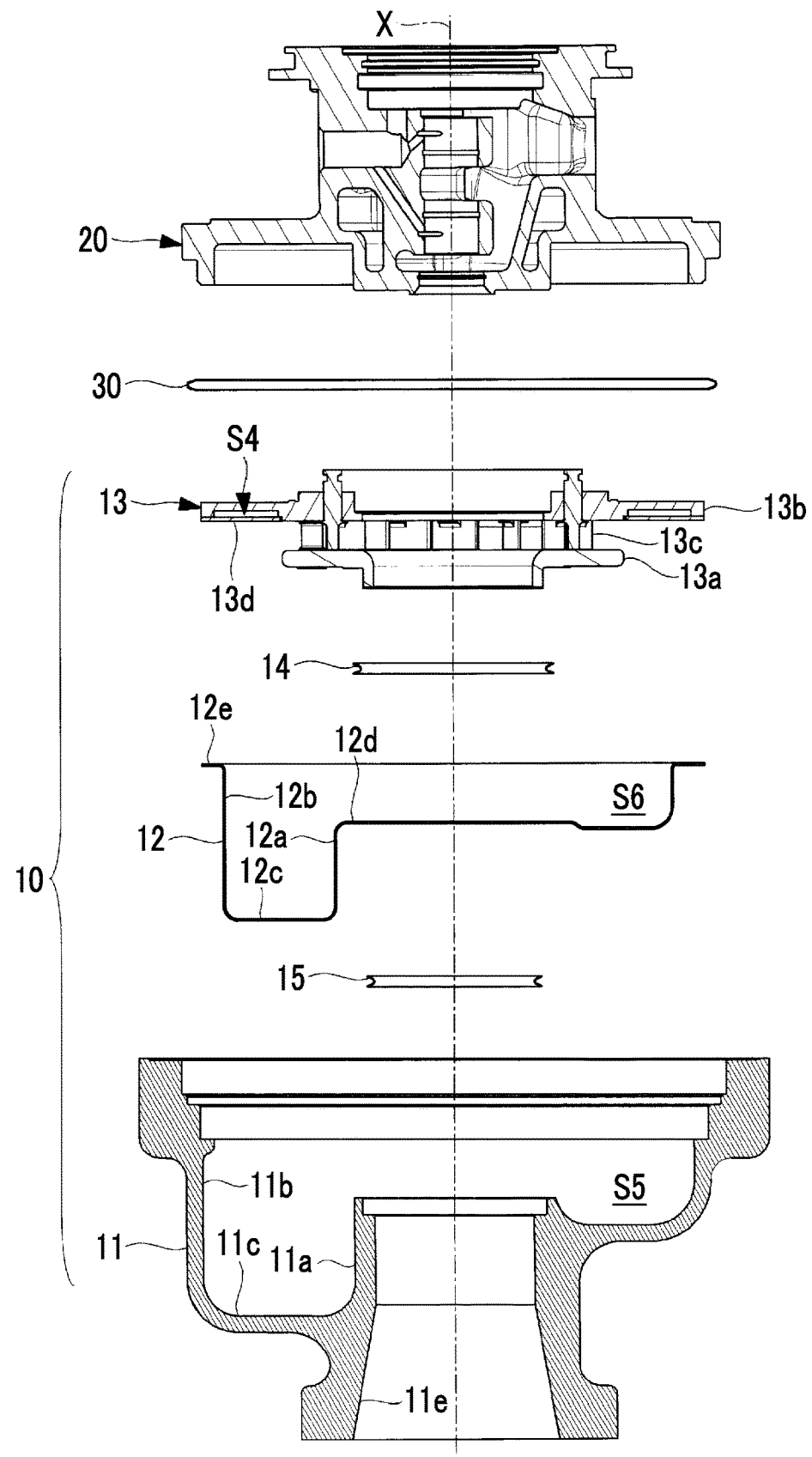
FIG. 2 is an exploded view of the turbo charger illustrated in FIG. 1.

As illustrated in FIG. 1 (longitudinal cross-sectional view) and FIG. 2 (exploded view), the turbo charger 100 of the present embodiment is provided with the turbine housing 10 in which the turbine wheel (not illustrated) and the variable nozzle mechanism 13 adjusting the flow rate of the exhaust gas are accommodated, a bearing housing 20 accommodating a bearing (not illustrated) rotatably supporting the rotating shaft of the turbine wheel, and a sealing 30 disposed in contact with both the turbine housing 10 and the bearing housing 20.

The sealing 30 is a member that is annularly formed around an axis X of the rotating shaft 40 and has a V-shaped cross section. The sealing 30 is formed of a metal material. The sealing 30 is elastically deformed in a case where the sealing 30 is compressed along the axis X. The sealing 30 is compressed along the axis X and elastically deformed when the bearing housing 20 is fastened to a housing part 11 by a fastener (not illustrated). The restoring force of the sealing 30 causes a seal region to be formed over the entire circumference around the axis X between the bearing housing 20 and the housing part 11.

Next, the turbine housing 10 will be described in detail.

The turbine housing 10 is a member that is connected to the bearing housing 20 by the fastener (not illustrated). The turbine housing 10 has the housing part 11, a heat-shielding core (flow passage part) 12 forming a first heat-shielding space S1, a second heat-shielding space S2, and a third heat-shielding space S3 between the turbine housing 10 and the housing part 11, the variable nozzle mechanism 13, a sealing 14 for providing shielding between the variable nozzle mechanism 13 and the heat-shielding core 12, and a sealing 15 for providing shielding between the variable nozzle mechanism 13 and the housing part 11.

As illustrated in FIG. 2, when the turbine housing 10 is assembled, the sealing 15, the heat-shielding core 12, the sealing 14, and the variable nozzle mechanism 13 are installed in this order with respect to the housing part 11.

Figure 3:
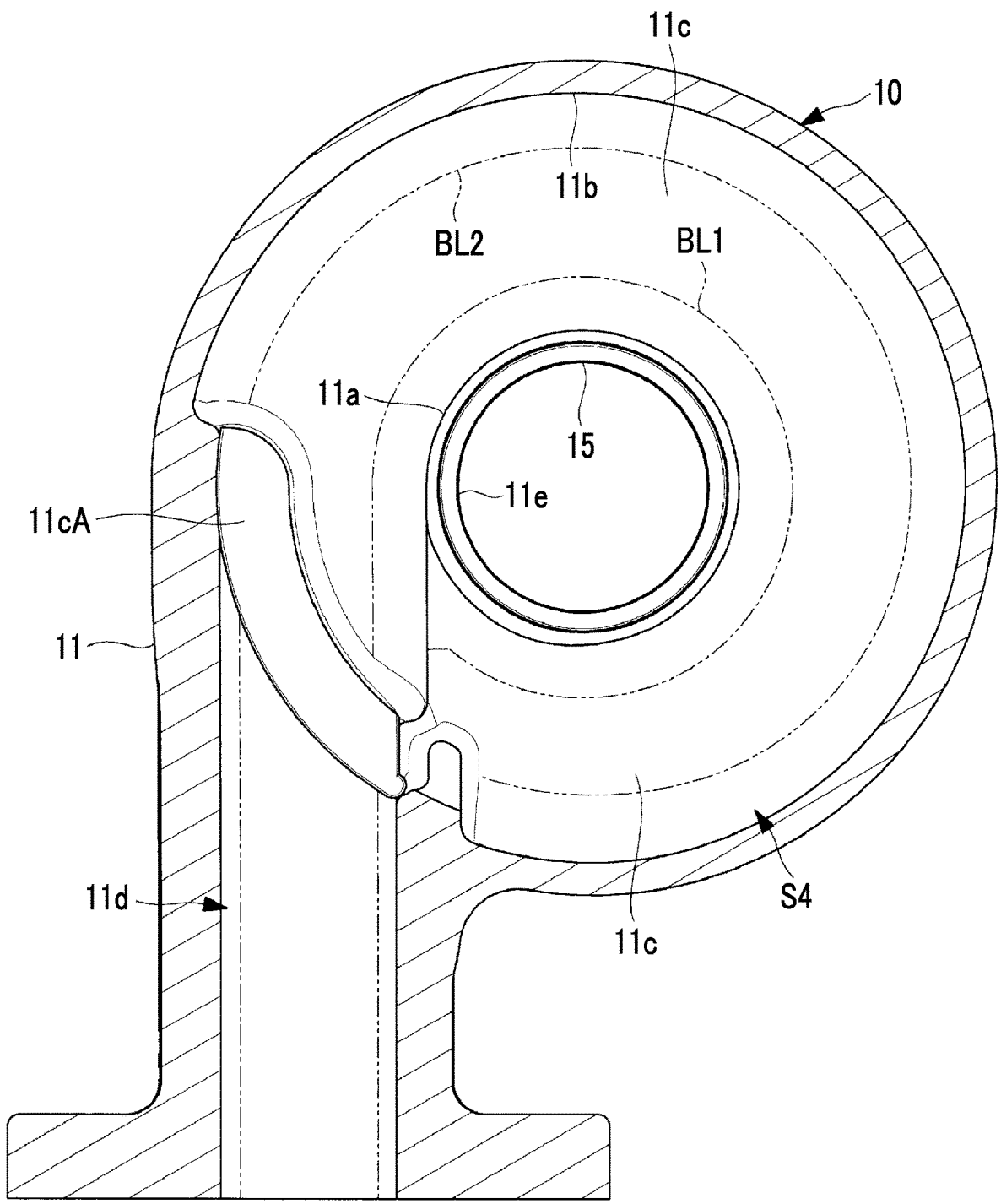
FIG. 3 is an I-I arrow cross-sectional view of a housing part illustrated in FIG. 1.

The housing part 11 is a member that forms a spiral space S5 extending around the rotating shaft 40 as illustrated in FIG. 3 (I-I arrow cross-sectional view of the housing part 11 illustrated in FIG. 1). The housing part 11 is formed by casting of a metal member (such as cast iron and cast stainless steel).

As illustrated in FIGS. 2 and 3, the housing part 11 has an inner circumferential side wall portion (first inner circumferential side wall portion) 11a, an outer circumferential side wall portion (first outer circumferential side wall portion) 11b, a bottom surface part (first bottom surface part) 11c, an exhaust gas introduction port 11d, and an exhaust gas outlet 11e. The spiral space S5 is formed by the inner circumferential side wall portion 11a, the outer circumferential side wall portion 11b, and the bottom surface part 11c.

In FIG. 3, a boundary line BL1 indicates the boundary position between the bottom surface part 11c and the inner circumferential side wall portion 11a and a boundary line BL2 indicates the boundary position between the bottom surface part 11c and the outer circumferential side wall portion 11b. FIG. 3 is a diagram illustrating the housing part 11 in a state where the heat-shielding core 12 is not disposed.

Figure 4:
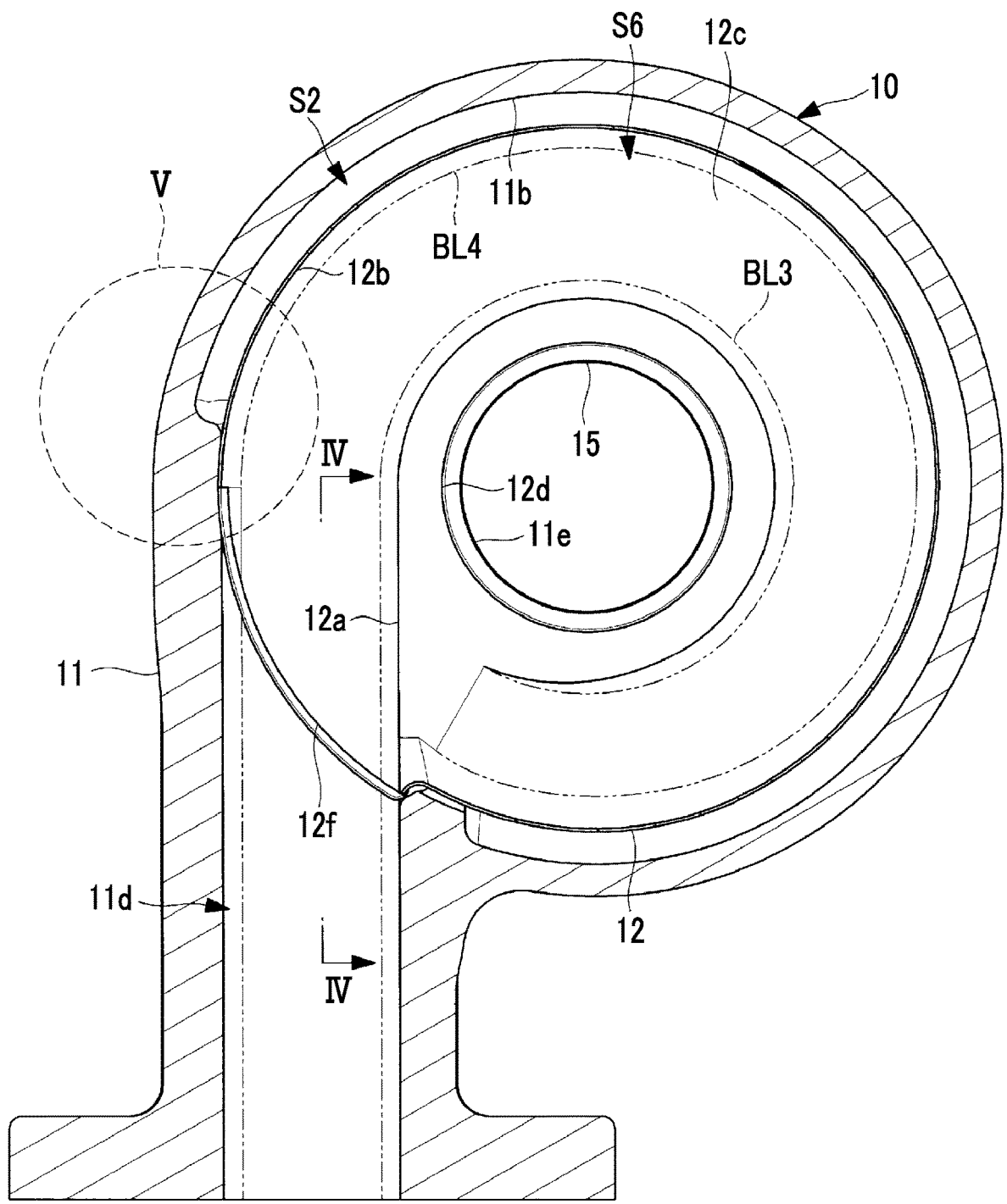
FIG. 4 is an I-I arrow cross-sectional view of the housing part and a heat-shielding core illustrated in FIG. 1.

As illustrated in FIG. 4 (I-I arrow cross-sectional view of the housing part 11 and the heat-shielding core 12 illustrated in FIG. 1), the heat-shielding core 12 is a member that forms a spiral exhaust gas flow passage S6 in which the exhaust gas introduced from the exhaust gas introduction port 11d flows. The heat-shielding core 12 is molded from a metal member (heat-resistant steel such as austenitic stainless steel).

In FIG. 4, a boundary line BL3 indicates the boundary position between a bottom surface part 12c and an inner circumferential side wall portion 12a and a boundary line BL4 indicates the boundary position between the bottom surface part 12c and an outer circumferential side wall portion 12b.

As illustrated in FIGS. 2 and 4, the heat-shielding core 12 has the inner circumferential side wall portion (second inner circumferential side wall portion) 12a, the outer circumferential side wall portion (second outer circumferential side wall portion) 12b, the bottom surface part (second bottom surface part) 12c, an inner circumferential side flange part 12d, an outer circumferential side flange part 12e, and an opening portion 12f. The exhaust gas flow passage S6 is formed by the inner circumferential side wall portion 12a, the outer circumferential side wall portion 12b, and the bottom surface part 12c.

As illustrated in FIG. 2, the inner circumferential side flange part 12d is formed so as to protrude from the inner circumferential side wall portion 12a to the inner circumferential side in the radial direction of the axis X. The outer circumferential side flange part 12e is formed so as to protrude from the outer circumferential side wall portion 12b to the outer circumferential side in the radial direction of the axis X.

The opening portion 12f is a part that opens toward the exhaust gas introduction port 11d. The outer circumferential side wall portion 12b of the heat-shielding core 12 is not provided at the part of the opening portion 12f. Accordingly, the exhaust gas introduced from the exhaust gas introduction port 11d is guided to the exhaust gas flow passage S6 via the opening portion 12f.

The first heat-shielding space S1, the second heat-shielding space S2, and the third heat-shielding space S3 formed between the inner circumferential surface of the housing part 11 and the outer circumferential surface of the heat-shielding core 12 will be described below.

Figure 5:
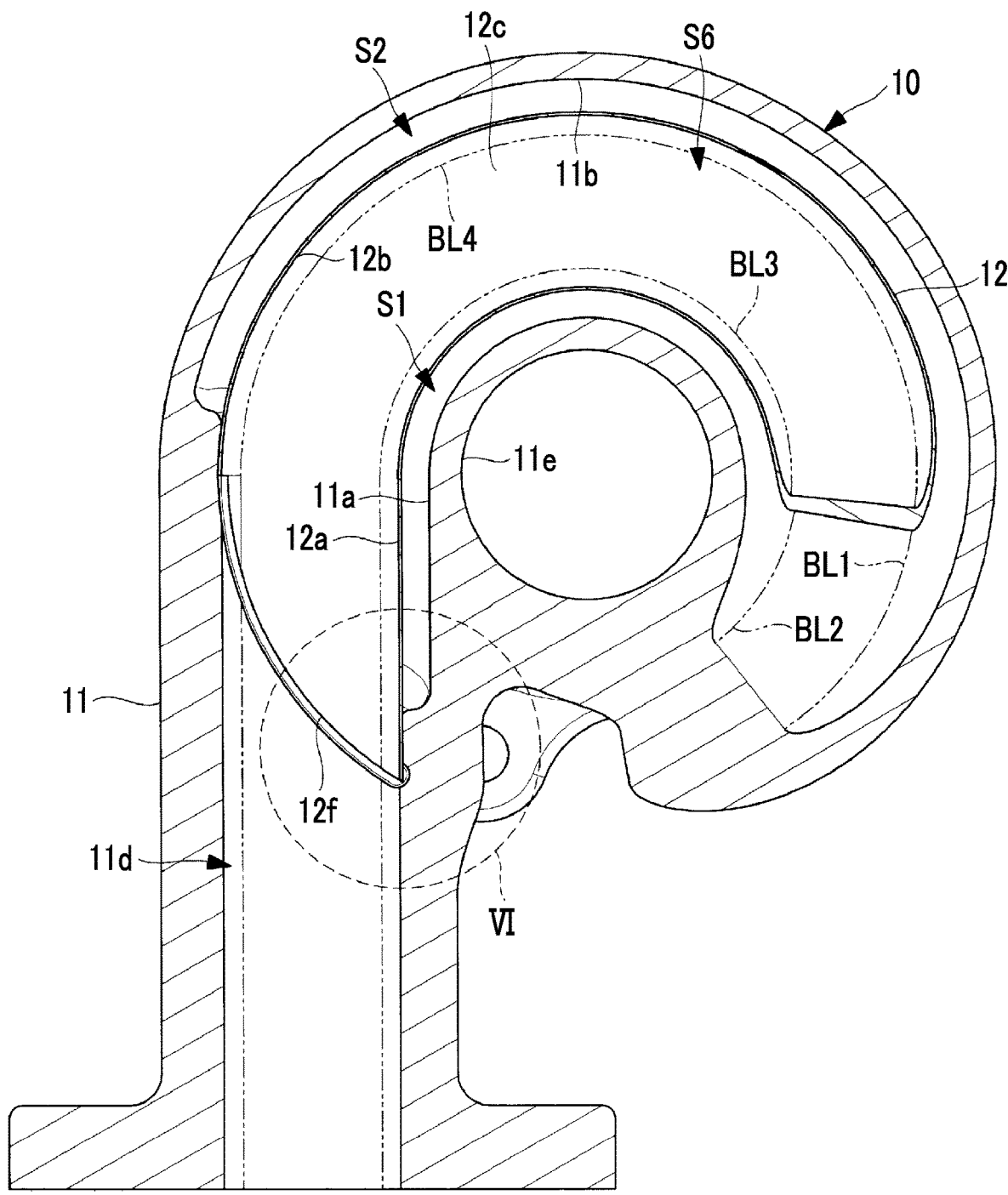
FIG. 5 is an II-II arrow cross-sectional view of a turbine housing illustrated in FIG. 1.

As illustrated in FIG. 1 and FIG. 5 (II-II arrow cross-sectional view of the turbine housing illustrated in FIG. 1), the first heat-shielding space S1 is formed between the inner circumferential side wall portion 11a and the inner circumferential side wall portion 12a. The inner circumferential side wall portion 11a is the inner circumferential surface of the housing part 11 and the inner circumferential side wall portion 12a is the outer circumferential surface of the heat-shielding core 12. As illustrated in FIGS. 1 and 4, the second heat-shielding space S2 is formed between the outer circumferential side wall portion 11b and the outer circumferential side wall portion 12b. The outer circumferential side wall portion 11b is the inner circumferential surface of the housing part 11 and the outer circumferential side wall portion 12b is the outer circumferential surface of the heat-shielding core 12. As illustrated in FIG. 1, the third heat-shielding space S3 is formed between the bottom surface part 11c and the bottom surface part 12c. The bottom surface part 11c is the inner circumferential surface of the housing part 11 and the bottom surface part 12c is the outer circumferential surface of the heat-shielding core 12.

As illustrated in FIG. 1, the first heat-shielding space S1, the second heat-shielding space S2, and the third heat-shielding space S3 intercommunicate and form a single space. Each of the first heat-shielding space S1, the second heat-shielding space S2, and the third heat-shielding space S3 functions as a space that prevents the thermal energy of the exhaust gas circulating through the exhaust gas flow passage S6 from dissipating from the heat-shielding core 12 to the outside via the housing part 11. The temperature of the exhaust gas discharged from the internal combustion engine is, for example, 800° C. to 1,000° C.

The variable nozzle mechanism 13 is a mechanism that guides the exhaust gas introduced from the exhaust gas introduction port 11d of the housing part 11 to the exhaust gas flow passage S6 of the heat-shielding core 12 to the turbine wheel connected to the rotating shaft 40. The variable nozzle mechanism 13 has a nozzle plate 13a disposed on the housing part 11 side, a nozzle mount 13b disposed on the bearing housing 20 side, a nozzle 13c attached to the nozzle mount 13b, and a heat-shielding plate 13d disposed at a position in contact with the exhaust gas flow passage S6.

As illustrated in FIGS. 1 and 2, a fourth heat-shielding space S4 is formed between the upper surface of the heat-shielding plate 13d and the lower surface of the nozzle mount 13b. The fourth heat-shielding space S4 functions as a space that prevents the thermal energy of the exhaust gas circulating through the exhaust gas flow passage S6 from dissipating from the heat-shielding plate 13d to the outside via the variable nozzle mechanism 13. The heat-shielding plate 13d is molded from a metal member (heat-resistant steel such as austenitic stainless steel).

The sealing 14 is a member that is annularly formed around the axis X of the rotating shaft 40 and has a V-shaped cross section. The sealing 14 is formed of a metal material. The sealing 14 is elastically deformed in a case where the sealing 14 is compressed along the axis X. The sealing 14 is compressed along the axis X and elastically deformed when the bearing housing 20 is fastened to the housing part 11 by the fastener (not illustrated). The restoring force of the sealing 14 causes a seal region to be formed over the entire circumference around the axis X between the variable nozzle mechanism 13 and the housing part 11.

Next, a structure for fixing the heat-shielding core to the inside of the turbine housing 10 will be described.

Figure 6:
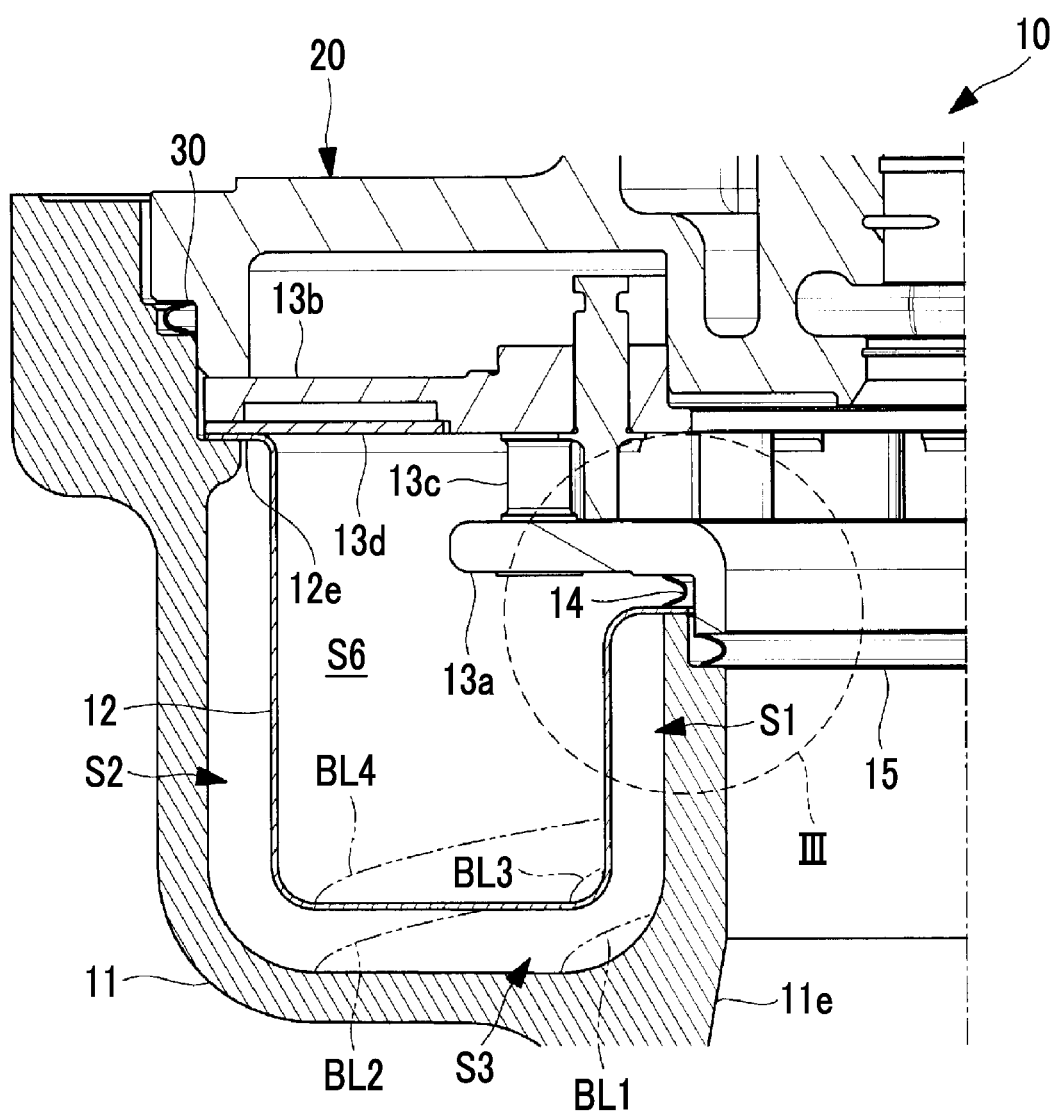
FIG. 6 is a partially enlarged view of the turbo charger illustrated in FIG. 1.
Figure 7:
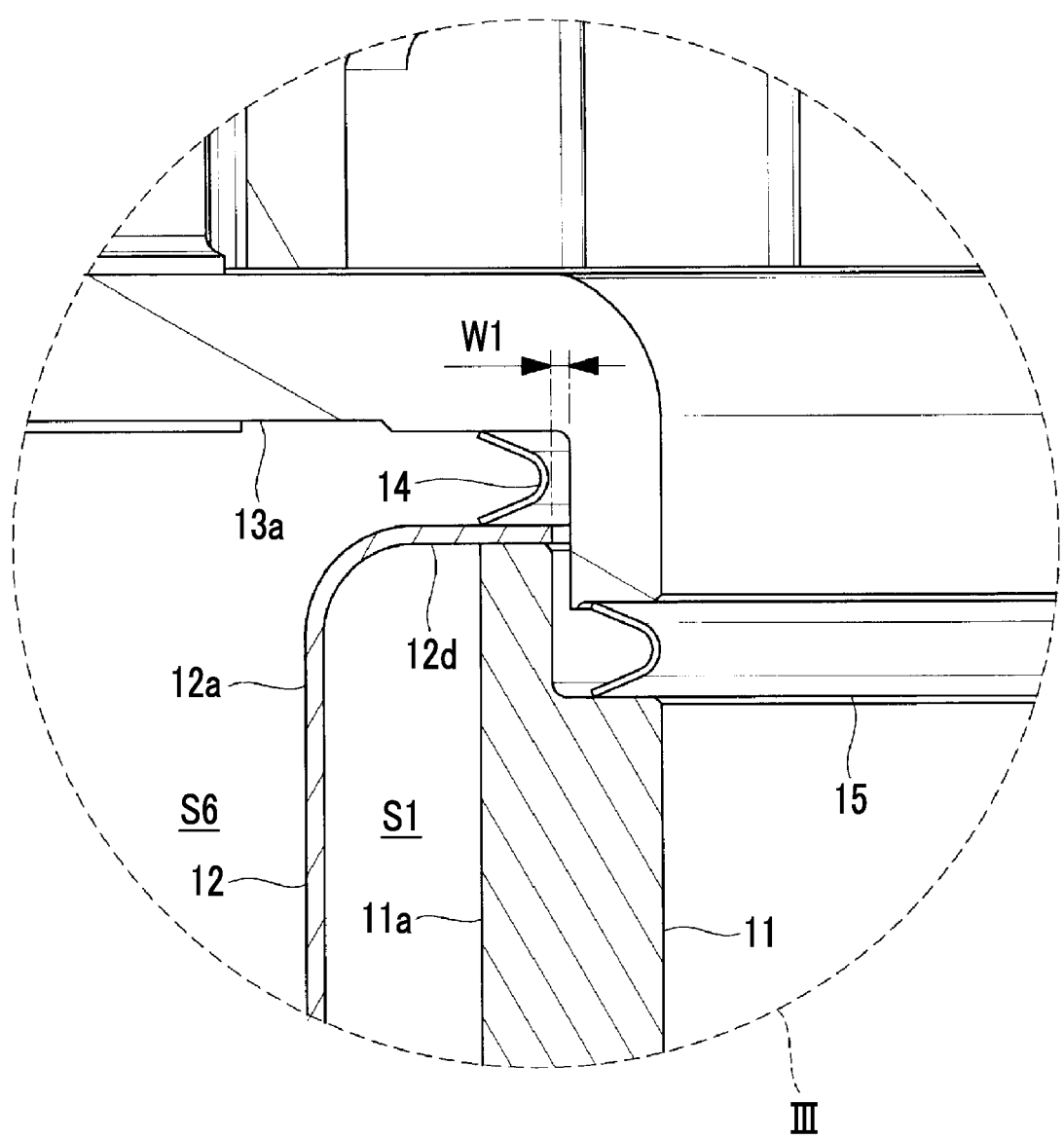
FIG. 7 is a partially enlarged view of the III part illustrated in FIG. 6.

As illustrated in FIG. 6 (partially enlarged view of the turbo charger 100 illustrated in FIG. 1) and FIG. 7 (partially enlarged view of the III part illustrated in FIG. 6), the inner circumferential side flange part 12d is fixed between the nozzle plate 13a and the housing part 11 in a state where the sealing 14 is interposed between the inner circumferential side flange part 12d and the nozzle plate 13a. Illustrated in FIG. 7 is the heat-shielding core 12 in a normal temperature state where no exhaust gas circulates through the exhaust gas flow passage S6. As illustrated in FIG. 7, a gap W1 is formed between the outer circumferential surface of the nozzle plate 13a and the inner circumferential side end portion of the inner circumferential side flange part 12d in the normal temperature state. By the gap W1 being provided in the normal temperature state, it is possible to prevent contact between the inner circumferential side end portion of the inner circumferential side flange part 12d and the outer circumferential surface of the nozzle plate 13a in a case where the heat-shielding core 12 thermally expands during operation in which exhaust gas circulates through the exhaust gas flow passage S6.

The sealing 15 is a member that is annularly formed around the axis X of the rotating shaft 40 and has a V-shaped cross section. The sealing 15 is formed of a metal material. The sealing 15 is elastically deformed in a case where the sealing 15 is compressed along the axis X. The sealing 15 is compressed along the axis X and elastically deformed when the bearing housing 20 is fastened to the housing part 11 by the fastener (not illustrated). The restoring force of the sealing 15 causes a seal region to be formed over the entire circumference around the axis X between the variable nozzle mechanism 13 and the housing part 11.

In the turbine housing 10 of the present embodiment, a double seal region formed by the sealing 14 and the sealing 15 is formed between the exhaust gas flow passage S6 and the exhaust gas outlet 11e. As a result, exhaust gas directly flows out from the exhaust gas flow passage S6 to the exhaust gas outlet 11e and the problem that the thermal energy of the exhaust gas is lost in part is prevented.

As illustrated in FIG. 6, the outer circumferential side flange part 12e is fixed in a state of being interposed between the housing part 11 and the bearing housing 20 together with the nozzle mount 13b and the heat-shielding plate 13d.

In this manner, the outer circumferential side flange part 12e of the heat-shielding core 12 is fixed in a restrained state via no sealing. The inner circumferential side flange part 12d of the heat-shielding core 12 is fixed in an unrestrained state where the inner circumferential side flange part 12d is movable in the axis X direction and the radial direction even in the event of thermal expansion via the sealing 14. Accordingly, the heat-shielding core 12 is capable of preventing the problem of internal thermal stress generation and breakage even in the event of thermal expansion caused by the heat of exhaust gas during operation.

Seal regions preventing the exhaust gas introduced from the exhaust gas introduction port 11d from being guided to the first heat-shielding space S1, the second heat-shielding space S2, and the third heat-shielding space S3 will be described below with reference to FIGS. 8 to 10.

Figure 8:
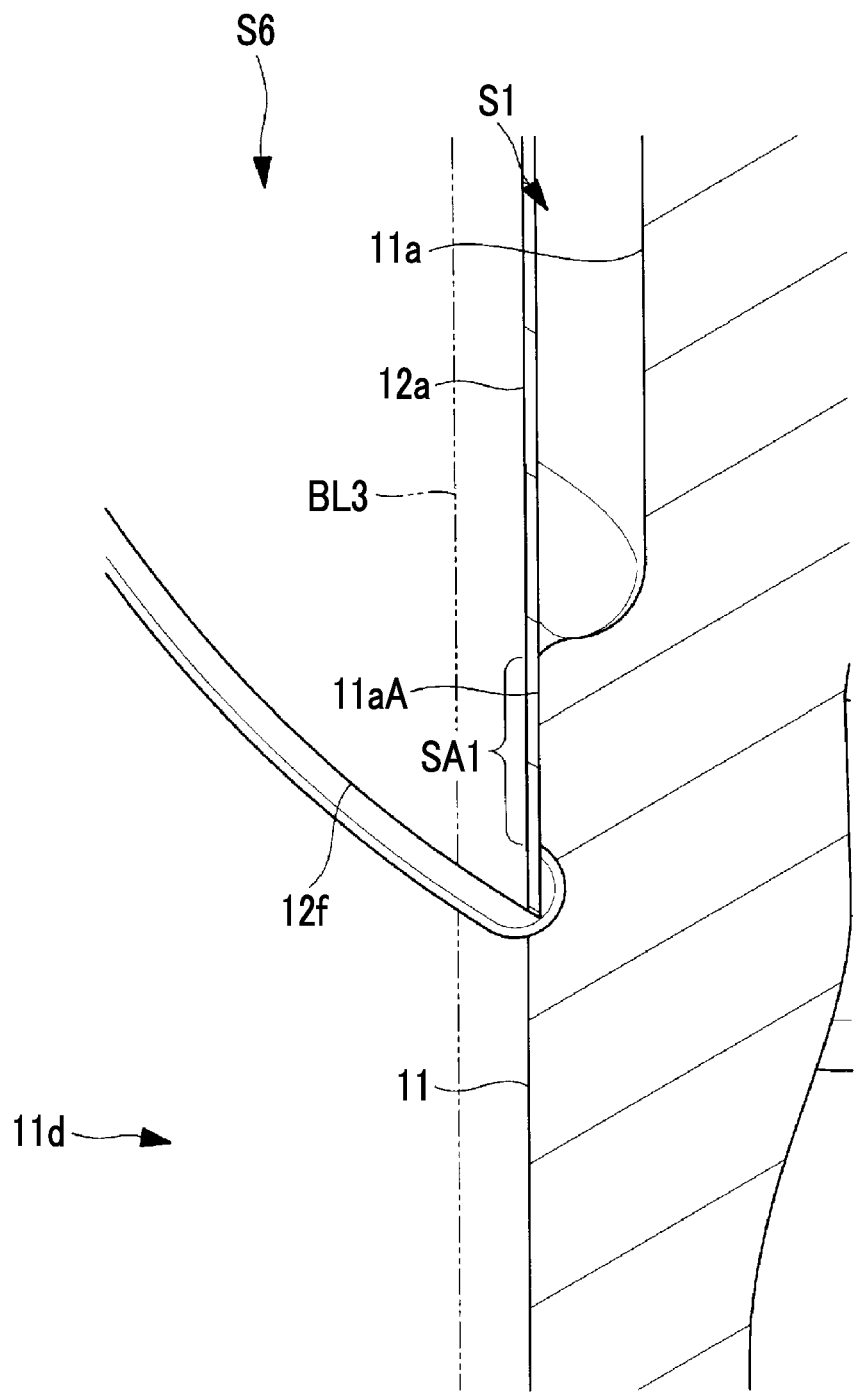
FIG. 8 is a partially enlarged view of the VI part illustrated in FIG. 5.

FIG. 8 is a partially enlarged view of the VI part illustrated in FIG. 5. Illustrated in FIG. 8 is the part where the inner circumferential side wall portion 11a of the housing part 11 and the inner circumferential side wall portion 12a of the heat-shielding core 12 come into contact with each other at the exhaust gas introduction port 11d. As illustrated in FIG. 8, at the exhaust gas introduction port 11d, the inner circumferential side wall portion 12a forms an inner circumferential side seal region SA1 by contact with a tip portion 11aA of the inner circumferential side wall portion 11a.

The heat-shielding core 12 is formed of a metal material, and thus the heat-shielding core 12 expands due to the heat of exhaust gas. Accordingly, the inner circumferential side wall portion 12a is pressed toward the tip portion 11aA of the inner circumferential side wall portion 11a by the action of thermal expansion. In addition, the inner circumferential side wall portion 12a is pressed toward the tip portion 11aA of the inner circumferential side wall portion 11a by the action of the pressure of the exhaust gas circulating through the exhaust gas flow passage S6. Accordingly, the inner circumferential side seal region SA1 prevents the exhaust gas introduced into the exhaust gas introduction port 11d during operation of the turbo charger 100 from being guided to the first heat-shielding space S1 from the gap between the inner circumferential side wall portion 11a of the housing part 11 and the inner circumferential side wall portion 12a of the heat-shielding core 12.

Figure 9:
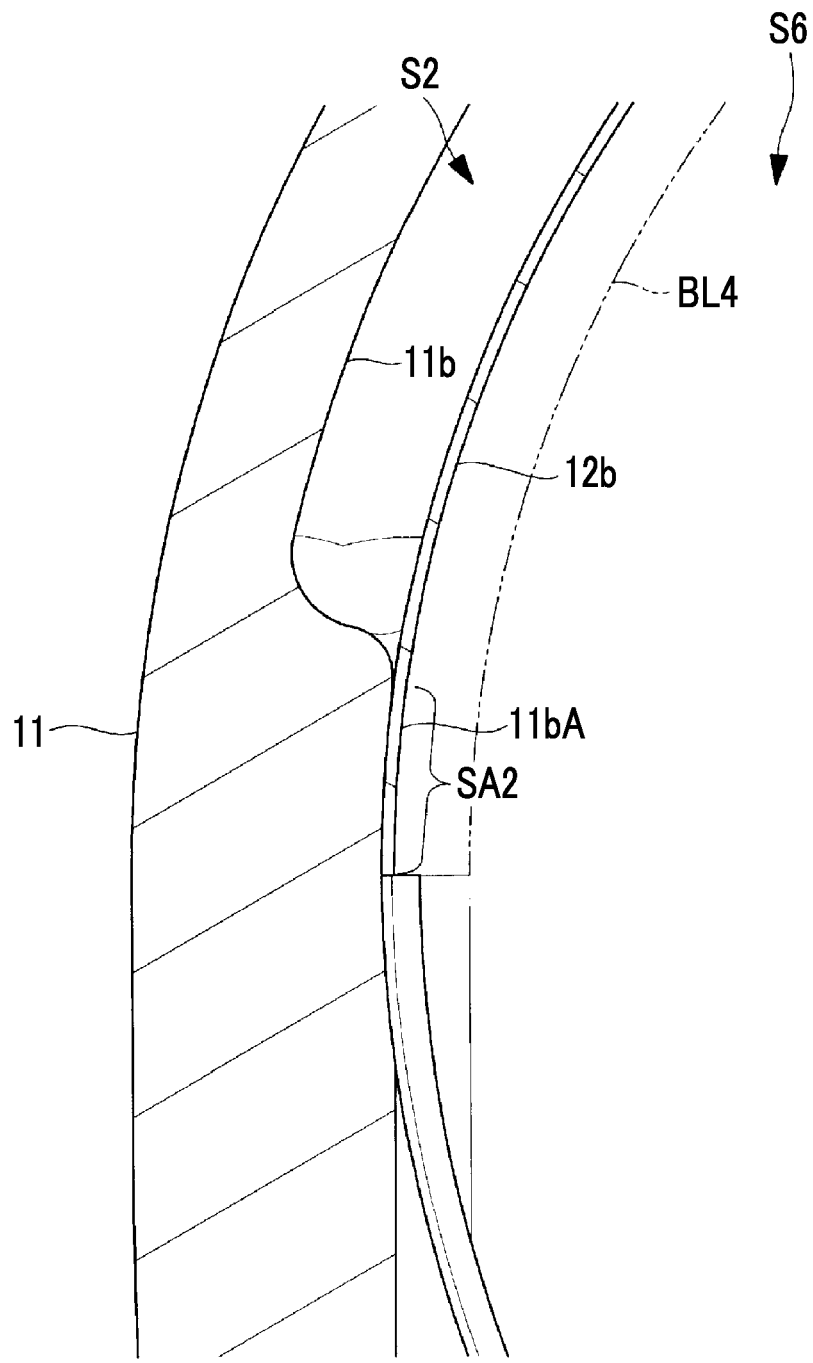
FIG. 9 is a partially enlarged view of the V part illustrated in FIG. 4.

FIG. 9 is a partially enlarged view of the V part illustrated in FIG. 4. Illustrated in FIG. 9 is the part where the outer circumferential side wall portion 11b of the housing part 11 and the outer circumferential side wall portion 12b of the heat-shielding core 12 come into contact with each other at the exhaust gas introduction port 11d. As illustrated in FIG. 9, at the exhaust gas introduction port 11d, the outer circumferential side wall portion 12b forms an outer circumferential side seal region SA2 by contact with a tip portion 11bA of the outer circumferential side wall portion 11b.

The heat-shielding core 12 is formed of a metal material, and thus the heat-shielding core 12 expands due to the heat of exhaust gas. Accordingly, the outer circumferential side wall portion 12b is pressed toward the tip portion 11bA of the outer circumferential side wall portion 11b by the action of thermal expansion. In addition, the outer circumferential side wall portion 12b is pressed toward the tip portion 11bA of the outer circumferential side wall portion 11b by the action of the pressure of the exhaust gas circulating through the exhaust gas flow passage S6. Accordingly, the outer circumferential side seal region SA2 prevents the exhaust gas introduced into the exhaust gas introduction port 11d during operation of the turbo charger 100 from being guided to the second heat-shielding space S2 from the gap between the outer circumferential side wall portion 11b of the housing part 11 and the outer circumferential side wall portion 12b of the heat-shielding core 12.

Figure 10:
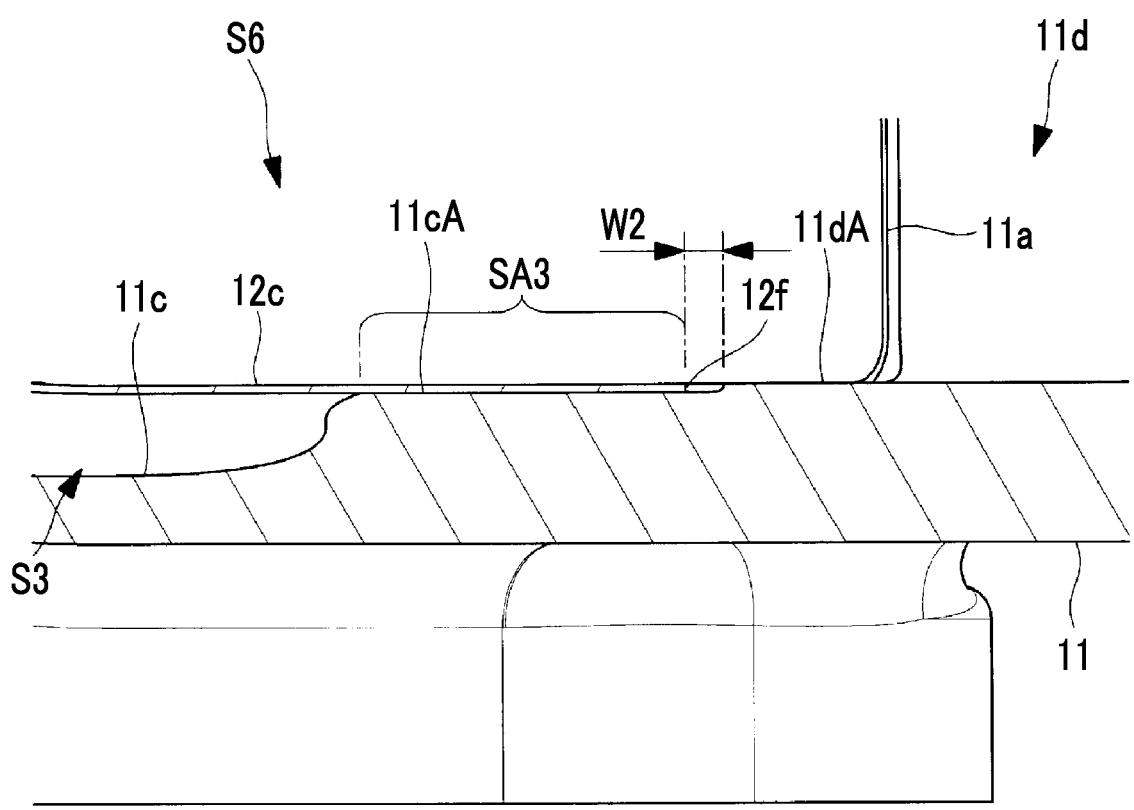
FIG. 10 is an IV-IV arrow cross-sectional view of the turbine housing illustrated in FIG. 4.
Figure 11:
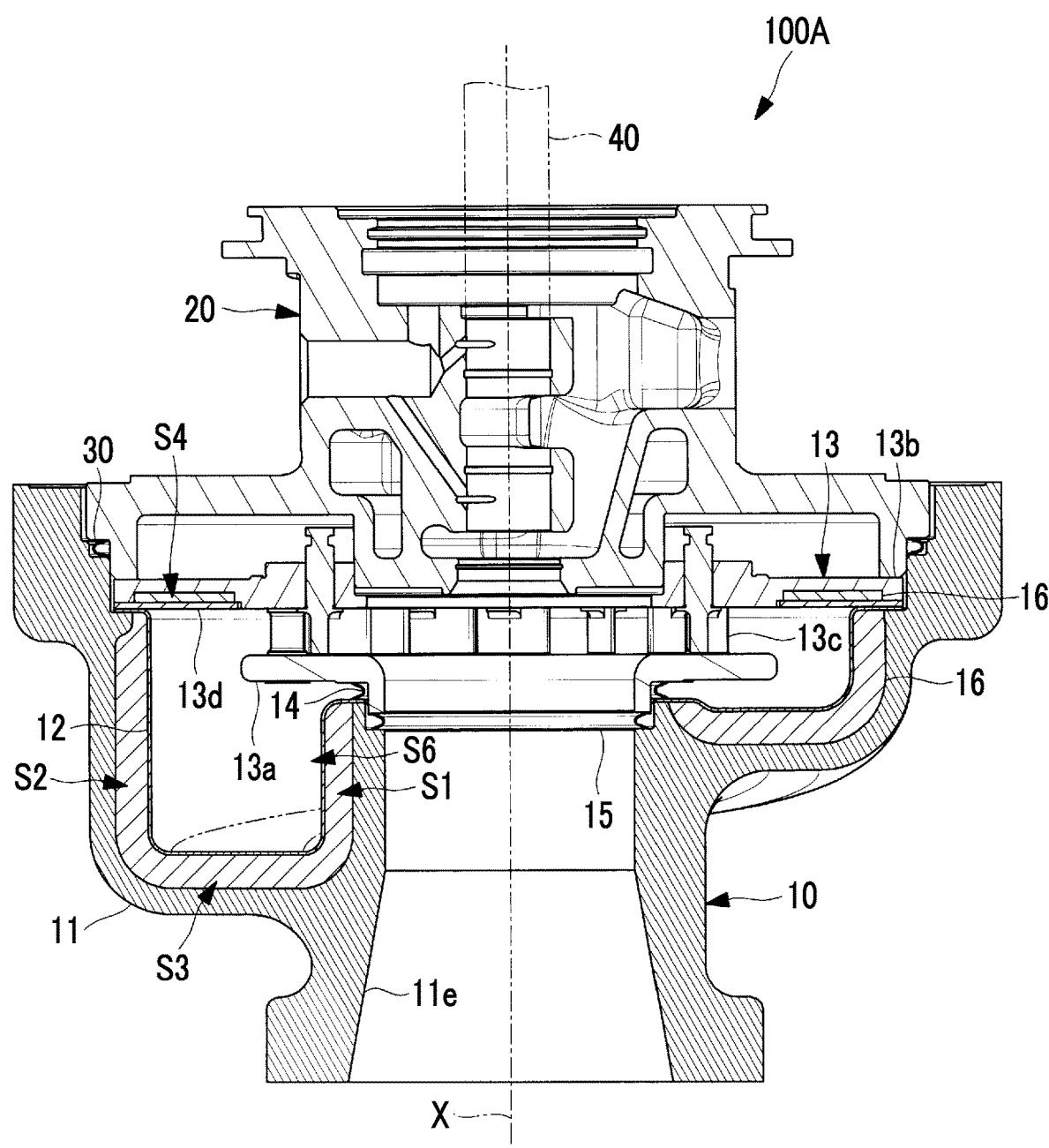
FIG. 11 is a longitudinal cross-sectional view illustrating a turbo charger according to a second embodiment of the present invention.

FIG. 10 is a IV-IV arrow cross-sectional view of the turbine housing 10 illustrated in FIG. 4. Illustrated in FIG. 10 is the part where the bottom surface part 11c of the housing part 11 and the bottom surface part 12c of the heat-shielding core 12 come into contact with each other at the exhaust gas introduction port 11d. As illustrated in FIG. 10, at the exhaust gas introduction port 11d, the bottom surface part 12c forms a bottom surface side seal region SA3 by contact with the bottom surface part 11c.

The heat-shielding core 12 is formed of a metal material, and thus the heat-shielding core 12 expands due to the heat of exhaust gas. Accordingly, the bottom surface part 12c is pressed toward a tip portion 11cA of the bottom surface part 11c by the action of thermal expansion. In addition, the bottom surface part 12c is pressed toward the tip portion 11cA of the bottom surface part 11c by the action of the pressure of the exhaust gas circulating through the exhaust gas flow passage S6. Accordingly, the bottom surface side seal region SA3 prevents the exhaust gas introduced into the exhaust gas introduction port 11d during operation of the turbo charger 100 from being guided to the third heat-shielding space S3 from the gap between the bottom surface part 11c of the housing part 11 and the bottom surface part 12c of the heat-shielding core 12.

As illustrated in FIG. 10, the tip portion 11cA of the bottom surface part 11c is shaped so as to be recessed downward beyond a bottom surface 11dA of the exhaust gas introduction port 11d. This is to generate no disturbance in the air flow of the exhaust gas introduced into the exhaust gas flow passage S6 from the exhaust gas introduction port 11d by giving the same height to the bottom surface part 12c of the heat-shielding core 12 and the bottom surface 11dA of the exhaust gas introduction port 11d.

Illustrated in FIG. 10 is the heat-shielding core 12 in the normal temperature state where no exhaust gas circulates through the exhaust gas flow passage S6. As illustrated in FIG. 10, a gap W2 is formed between the opening portion 12f, which is the tip of the bottom surface part 12c in the normal temperature state, and the boundary position between the tip portion 11cA and the bottom surface 11dA. By the gap W2 being provided in the normal temperature state, it is possible to prevent the housing part 11 and the opening portion 12f of the heat-shielding core 12 from coming into contact with each other at the boundary position between the tip portion 11cA and the bottom surface 11dA in a case where the heat-shielding core 12 thermally expands during operation in which exhaust gas circulates through the exhaust gas flow passage S6.

As described above, at the exhaust gas introduction port 11d, each of the inner circumferential side seal region SA1, the outer circumferential side seal region SA2, and the bottom surface side seal region SA3 is formed between the housing part 11 and the heat-shielding core 12. In addition, as illustrated in FIG. 6, the inner circumferential side flange part 12d and the outer circumferential side flange part 12e of the heat-shielding core 12 form a seal region with the variable nozzle mechanism 13. Accordingly, at the exhaust gas introduction port 11d, a seal region is formed over the entire circumference of the inner side, outer side, bottom, and upper surfaces of the exhaust gas flow passage S6 between the housing part 11 and the heat-shielding core 12. This seal region prevents the problem of exhaust gas introduction from the exhaust gas introduction port 11d into the first heat-shielding space S1, the second heat-shielding space S2, and the third heat-shielding space S3.

The action and effect of the turbine housing 10 of the present embodiment will be described below.

According to the turbine housing 10 of the present embodiment, the first heat-shielding space S1, the second heat-shielding space S2, and the third heat-shielding space S3 are disposed between the outer circumferential surface of the heat-shielding core 12 disposed in the spiral space S5 and the inner circumferential surface of the housing part 11 forming a spiral space. Accordingly, the amount of loss of thermal energy dissipating to the outside via the housing part 11 from the heat-shielding core 12 where the exhaust gas flow passage S6 is formed is reduced. In addition, the heat-shielding core 12 of the turbine housing 10 according to the present embodiment has the inner circumferential side flange part 12d and the outer circumferential side flange part 12e, the turbine housing 10 has a simple structure in which the inner circumferential side flange part 12d and the outer circumferential side flange part 12e are fixed between other members, and thus the mass productivity of the turbine housing 10 is high. In addition, in the turbine housing 10 of the present embodiment, the inner circumferential side flange part 12d is fixed between the variable nozzle mechanism 13 and the housing part 11 in a state where the sealing 14 elastically deformable in the axis X direction along the rotating shaft is interposed between the variable nozzle mechanism 13 and the inner circumferential side flange part 12d. Accordingly, the sealing 14 is elastically deformed in the rotating shaft direction and the thermal stress generated in the heat-shielding core 12 can be reduced even in a case where the heat-shielding core 12 expands in the rotating shaft direction due to the heat of exhaust gas.

In the turbine housing 10 of the present embodiment, the first heat-shielding space S1 is formed between the inner circumferential side wall portion 11a and the inner circumferential side wall portion 12a, the second heat-shielding space S2 is formed between the outer circumferential side wall portion 11b and the outer circumferential side wall portion 12b, and the third heat-shielding space S3 is formed between the bottom surface part 11c and the bottom surface part 12c.

As a result, the amount of loss of thermal energy dissipating from the heat-shielding core 12 to the outside via the housing part 11 is reduced by the shielding spaces respectively provided on the inner side of the inner circumferential side wall portion 11a of the heat-shielding core 12, the outer side of the outer circumferential side wall portion 11b of the heat-shielding core 12, and the lower side of the bottom surface part 11c of the heat-shielding core 12.

At the exhaust gas introduction port 11d in the turbine housing 10 according to the present embodiment, the inner circumferential side wall portion 12a forms the inner circumferential side seal region SA1 by contact with the inner circumferential side wall portion 11a, the outer circumferential side wall portion 12b forms the outer circumferential side seal region SA2 by contact with the outer circumferential side wall portion 11b, and the bottom surface part 12c forms the bottom surface side seal region SA3 by contact with the bottom surface part 11c.

As a result, each of the inner circumferential side seal region SA1, the outer circumferential side seal region SA2, and the bottom surface side seal region SA3 is formed at the exhaust gas introduction port 11d formed at the housing part 11. Accordingly, no gap is formed between the exhaust gas introduction port 11d of the housing part 11 and the opening portion 12f of the heat-shielding core 12 and the problem that the exhaust gas guided from the exhaust gas introduction port 11d to the exhaust gas flow passage S6 of the heat-shielding core 12 is guided in part from the exhaust gas introduction port 11d to the first heat-shielding space S1, the second heat-shielding space S2, and the third heat-shielding space S3 is prevented.

Second Embodiment

Next, a turbo charger 100A according to a second embodiment of the present invention will be described.

The first heat-shielding space S1, the second heat-shielding space S2, the third heat-shielding space S3, and the fourth heat-shielding space S4 are spaces where no other members are disposed and air is used as a heating insulating material in the turbo charger 100 according to the first embodiment. In the turbo charger 100A of the present embodiment, the first heat-shielding space S1, the second heat-shielding space S2, the third heat-shielding space S3, and the fourth heat-shielding space S4 are filled with a heat-shielding member 16.

Used as the heat-shielding member 16 is, for example, a ceramic fiber containing alumina ($Al_2O_3$) and silica ($SiO_2$) as main components. The heat insulation properties of the first heat-shielding space S1, the second heat-shielding space S2, the third heat-shielding space S3, and the fourth heat-shielding space S4 are further improved by the use of the heat-shielding member 16. The amount of loss of thermal energy dissipating from the heat-shielding core to the outside via the housing part 11 is further reduced by the use of the heat-shielding member 16.

REFERENCE SIGNS LIST

10 Turbine housing
11 Housing part
11a Inner circumferential side wall portion (first inner circumferential side wall portion)
11b Outer circumferential side wall portion (first outer circumferential side wall portion)
11c Bottom surface part (first bottom surface part)
12 Heat-shielding core (flow passage part)
12a Inner circumferential side wall portion (second inner circumferential side wall portion)
12b Outer circumferential side wall portion (second outer circumferential side wall portion)
12c Bottom surface part (second bottom surface part)
12d Inner circumferential side flange part
12e Outer circumferential side flange part
13 Variable nozzle mechanism (nozzle part)
14 Sealing (annular seal part)
16 Filling material (heat-shielding member)
20 Bearing housing
40 Rotating shaft
100, 100A Turbo charger
S1 First heat-shielding space
S2 Second heat-shielding space
S3 Third heat-shielding space
S4 Fourth heat-shielding space
S5 Spiral space
S6 Exhaust gas flow passage
SA1 Inner circumferential side seal region
SA2 Outer circumferential side seal region
SA3 Bottom surface side seal region

The invention claimed is:

1. A turbine housing connected to a bearing housing rotatably supporting a rotating shaft of a turbine wheel, the turbine housing comprising:
   a housing part having a first inner circumferential side wall portion, a first outer circumferential side wall portion, and a first bottom surface part and forming a spiral space extending around the rotating shaft;
   a flow passage part having a second inner circumferential side wall portion, a second outer circumferential side wall portion, and a second bottom surface part, disposed in the spiral space, and forming a spiral exhaust gas flow passage in which exhaust gas introduced from an exhaust gas introduction port flows;
   a nozzle part guiding the exhaust gas introduced into the exhaust gas flow passage to the turbine wheel connected to the rotating shaft; and
   a first annular seal part that is annularly formed around an axis of the rotating shaft, the first annular seal part being elastically deformable in a direction along the rotating shaft, wherein a heat-shielding space is formed between an inner circumferential surface of the housing part and an outer circumferential surface of the flow passage part,
   the flow passage part has an inner circumferential side flange part protruding from the second inner circumferential side wall portion to an inner circumferential side in a radial direction of the rotating shaft and an outer circumferential side flange part protruding from the second outer circumferential side wall portion to an outer circumferential side in the radial direction, and
   the inner circumferential side flange part is fixed in a state of being directly in contact with both the first annular seal part and the housing part in a state where the first annular seal part is disposed in contact with both the inner circumferential side flange part and the nozzle part and the outer circumferential side flange part is fixed between the nozzle part and the housing part, one side of the inner circumferential side flange part in the direction along the rotating shaft directly contacting with the first annular seal part and the other side of the inner circumferential side flange part in the direction along the rotating shaft directly contacting with the housing part.

2. The turbine housing according to claim 1, wherein the heat-shielding space is formed between the first inner circumferential side wall portion and the second inner circumferential side wall portion, between the first outer circumferential side wall portion and the second outer circumferential side wall portion, and between the first bottom surface part and the second bottom surface part, respectively.

3. The turbine housing according to claim 1, wherein
   the exhaust gas introduction port is formed at the housing part,
   the flow passage part has an opening portion being open toward the exhaust gas introduction port, and
   the second inner circumferential side wall portion forms an inner circumferential side seal region by contact with the first inner circumferential side wall portion, the second outer circumferential side wall portion forms an outer circumferential side seal region by contact with the first outer circumferential side wall portion, and the second bottom surface part forms a bottom surface side seal region by contact with the first bottom surface part at the exhaust gas introduction port.

4. The turbine housing according to claim 1, further comprising:
   a heat-shielding member with which the heat-shielding space is filled.

5. A turbo charger comprising:
   a bearing housing rotatably supporting a rotating shaft of a turbine wheel; and
   the turbine housing according to claim 1 connected to the bearing housing.

6. The turbine housing according to claim 2, wherein
   the exhaust gas introduction port is formed at the housing part,
   the flow passage part has an opening portion being open toward the exhaust gas introduction port, and
   the second inner circumferential side wall portion forms an inner circumferential side seal region by contact with the first inner circumferential side wall portion, the second outer circumferential side wall portion forms an outer circumferential side seal region by contact with the first outer circumferential side wall portion, and the second bottom surface part forms a bottom surface side seal region by contact with the first bottom surface part at the exhaust gas introduction port.

7. The turbine housing according to claim 2, further comprising:
a heat-shielding member with which the heat-shielding space is filled.

8. The turbine housing according to claim 3, further comprising:
a heat-shielding member with which the heat-shielding space is filled.

9. A turbo charger comprising:
a bearing housing rotatably supporting a rotating shaft of a turbine wheel; and
the turbine housing according to claim 2 connected to the bearing housing.

10. A turbo charger comprising:
a bearing housing rotatably supporting a rotating shaft of a turbine wheel; and
the turbine housing according to claim 3 connected to the bearing housing.

11. A turbo charger comprising:
a bearing housing rotatably supporting a rotating shaft of a turbine wheel; and
the turbine housing according to claim 4 connected to the bearing housing.

12. The turbine housing according to claim 1, wherein a gap is formed between the outer circumferential surface of the nozzle part and an inner circumferential side end portion of the inner circumferential side flange part in a normal temperature state, where no exhaust gas circulates through the exhaust gas flow passage.

13. The turbine housing according to claim 1, further comprising:
a second annular seal part that is annularly formed around the axis of the rotating shaft, the second annular seal part being elastically deformable in the direction along the rotating shaft, the second annular seal part being disposed inside of the first annular seal part in the radial direction of the rotating shaft,
the second annular seal part is fixed in a state of being directly in contact with both the nozzle part and the housing part, one side of the second annular seal part in the direction along the rotating shaft directly contacting with the nozzle part and the other side of the second annular seal part in the direction along the rotating shaft directly contacting with the housing part.

* * * * *